United States Patent
Norman et al.

(10) Patent No.: US 6,827,537 B2
(45) Date of Patent: Dec. 7, 2004

(54) ORIENTLESS WELD NUT

(75) Inventors: James Norman, Sterling Heights, MI (US); Joseph Roman, Clinton Township, MI (US); Paul Albrecht, Clinton Township, MI (US); James Herring, Macomb Township, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/348,832

(22) Filed: Jan. 22, 2003

(65) Prior Publication Data

US 2004/0141825 A1 Jul. 22, 2004

(51) Int. Cl.⁷ .......................... F16B 37/06; B23K 11/30
(52) U.S. Cl. .......................... 411/171; 411/427; 219/93
(58) Field of Search .......................... 411/82, 171, 187, 411/303, 427, 435; 219/93, 107

(56) References Cited

U.S. PATENT DOCUMENTS

| | | | | |
|---|---|---|---|---|
| 2,761,483 A | * | 9/1956 | Richardson | 411/171 |
| RE24,567 E | * | 11/1958 | Richardson | 411/171 |
| 3,001,214 A | * | 9/1961 | Anderson | 411/171 |
| 3,140,738 A | * | 7/1964 | Johnson | 411/171 |
| 4,875,817 A | * | 10/1989 | Suzumura et al. | 411/171 |
| 5,808,266 A | * | 9/1998 | Cecil | 219/110 |
| 6,163,004 A | * | 12/2000 | Aoyama et al. | 219/93 |
| RE37,607 E | * | 3/2002 | Cecil | 219/110 |

* cited by examiner

Primary Examiner—Robert J. Sandy
Assistant Examiner—Ruth C. Rodriguez
(74) Attorney, Agent, or Firm—Thomas A. Jurecko

(57) ABSTRACT

A weld nut has weld projections on both sides. The projections concentrate heat and melt when in contact with a component part, to form a lasting weld of the nut to the component part. Because there are weld projections on both sides of the nut, there is no risk that the nut will be placed against the component part upside down.

4 Claims, 2 Drawing Sheets

US 6,827,537 B2

ORIENTLESS WELD NUT

TECHNICAL FIELD OF THE INVENTION

The present invention relates generally to weld nuts and more particularly to an orientless weld nut.

BACKGROUND OF THE INVENTION

Typical weld nuts have weld projections (small dimples that concentrate heat in controlled areas) on only one side. When the nut is welded to another component part, it is necessary to properly orient the nut so that the projections face the component part to which the nut is to be welded.

This need to correctly orient the nut causes manufacturing and welding problems. First the nut must be placed on the component part over a pin that centers it on a hole. This can be done manually or mechanically. If done manually, the nut is often incorrectly oriented due to human error. Even when done mechanically, errors can result. If the nut is applied upside down, the nut will either not weld to the component part at all, resulting in immediate failure of the weld, or the weld will be weak and fail in shipping or in use or when a threaded fastener is screwed into the nut. This failure leads to high repair, scrap, and inspection costs.

If the nut is located mechanically, there is an increased cost of equipment and maintenance. The mechanical devices used must orient and locate the nut. This can cause problems. Mechanical devices used to accomplish this include bowl feeders and rod type nut feeders. If the bowl feeder is dirty or improperly adjusted, the nuts can jam or be delivered upside down. If the pin wears or the rod type feeder is bent, worn or improperly adjusted, the nut can be mislocated off the pin. All of these problems will drive up the costs of maintenance, quality, inspection, repair and scrap, which have been traditionally high.

SUMMARY OF THE INVENTION

The orientless nut of this invention simplifies the entire process. The nut has weld projections on both sides. The nut can still be located manually or mechanically. There is no longer a risk that the nut can be placed upside down. As long as the nut is on the locating pin, the weld will be good.

One consideration that must be addressed to use the orientless nut involves the upper electrode that contacts the nut. The upper electrode must be recessed to provide clearance for the projections on the topside of the nut. Otherwise, the projections on the topside of the nut may weld to the electrode.

One object of this invention is to provide a weld nut having the foregoing features and capabilities.

Another object is to provide a method of welding a nut to a component part.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will be more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

Figure 1:
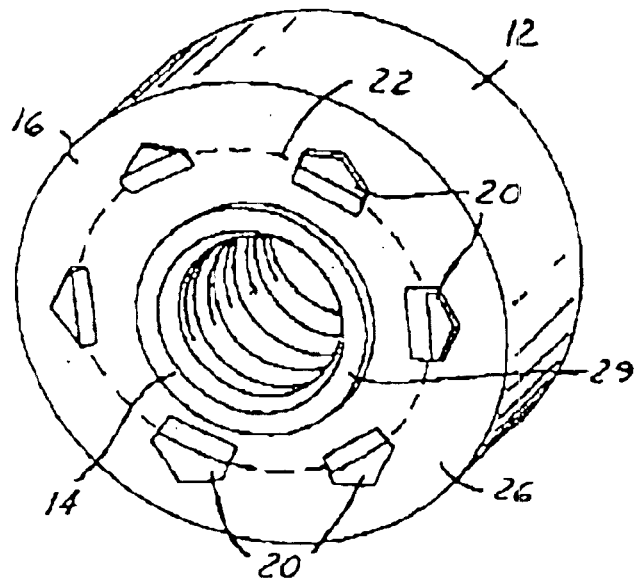
FIG. 1 is a perspective view of a weld nut embodying the invention.
Figure 2:
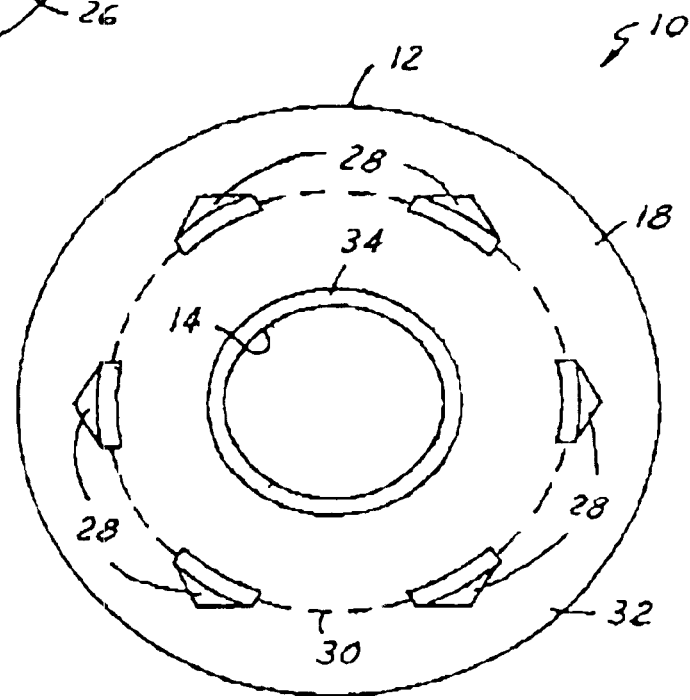
FIG. 2 is a plan view showing one side of the weld nut in FIG. 1.
Figure 3:
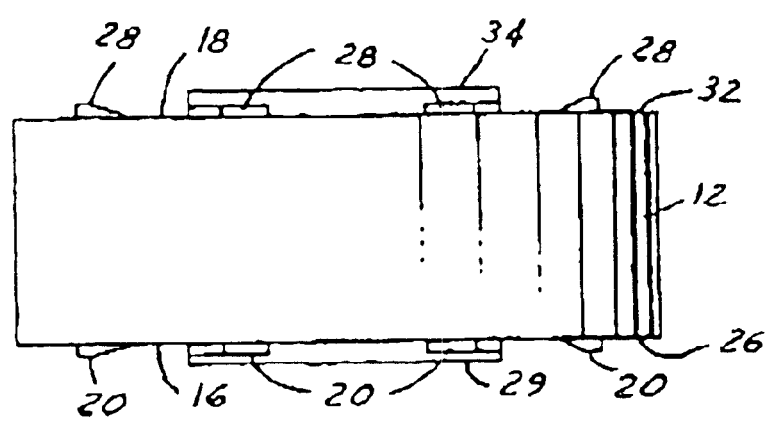
FIG. 3 is an edge view of the weld nut.

Referring now more particularly to the drawings and especially to FIGS. 1–3, there is shown a metallic, electrically conductive weld nut 10 constructed in accordance with the invention, having a nut body 12 provided with a central hole 14 and formed with outwardly facing, parallel, external surfaces 16 and 18 on opposite sides thereof.

Projecting outwardly from the surface 16 are a plurality of weld projections 20. The weld projections 20 project outwardly from the surface 16 the same distance, are spaced apart from one another equal distances, and are arranged in a circle 22 concentric with the central axis 24 of the nut. The surface 16 has a circular area 26 radially outwardly of and surrounding the circle 22 of weld projections, the circular area 26 being flat and intended to be engaged by a surface of a welding electrode as more fully described hereinafter. The surface 16 also has a circular pilot 29 extending outwardly therefrom around the central hole 14.

The opposite side of the nut has a plurality of weld projections 28 which project outwardly from the surface 18. The weld projections 28 project outwardly from the surface 18 the same distance, which is the same as that for the projections 20 on the surface 16, are spaced apart from one another equal distances, which is the same as the spacing of projections 20 on the surface 16, and are arranged in a circle 30 concentric with the central axis 24 of the nut and of the same diameter as the circle 22. The surface 18 has a circular area 32 radially outwardly of and surrounding the circle 30 of weld projections which is flat and intended to be engaged by a surface of a welding electrode as more fully described hereinafter. The surface 18 also has a circular pilot 34 extending outwardly therefrom around the central hole 14.

Figure 4:
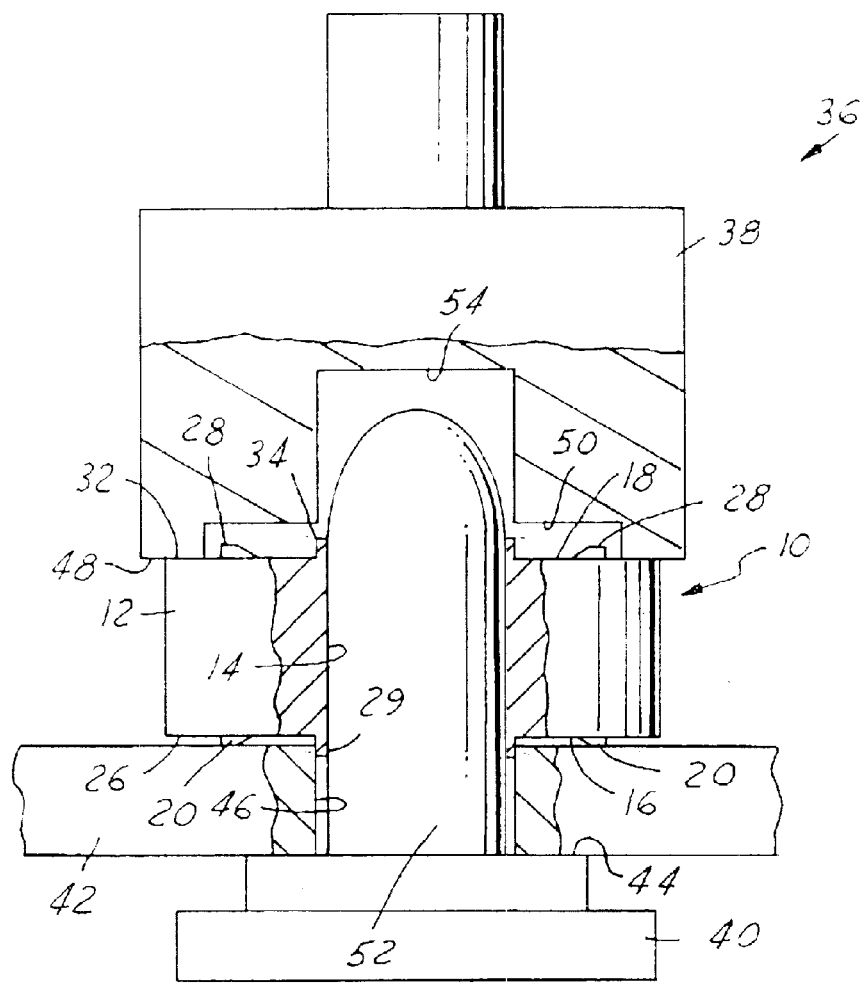
FIG. 4 is a view partly in elevation and partly in section showing the weld nut being welded to a component part by a weld gun.
Figure 5:
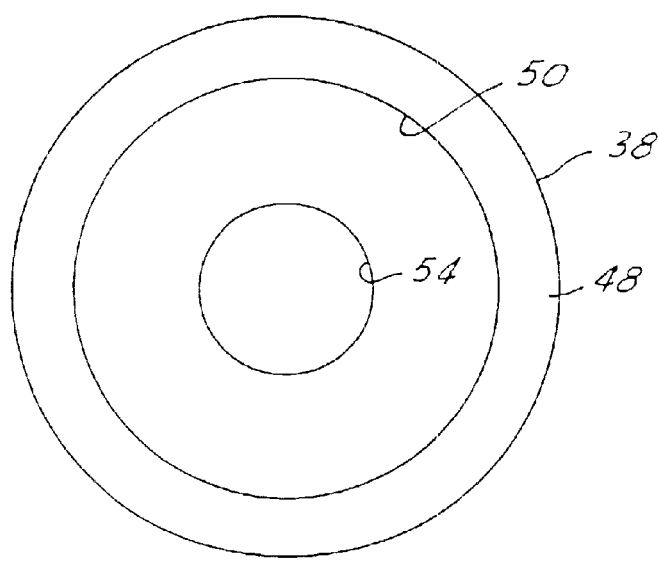
FIG. 5 is bottom view of the upper electrode of the weld gun.

Referring now to FIGS. 4 and 5, there is shown a weld gun 36 having an upper electrode 38 and a lower electrode 40 employed for welding the nut body 12 to a metallic, electrically conductive component part 42. The lower electrode has a flat upper surface 44 supporting the component part 42 in electrical contact therewith. The nut body 12 is placed over the component part 42 with the central hole 14 in the nut body aligned with an opening 46 in the component part and with one of its surfaces 16, 18, in this instance the surface 16, confronting the component part, and with the weld projections 20 in electrical contact with the component part.

The upper electrode 38 has a flat bottom surface 48 which engages the radially outer circular area 32 of the surface 18 of the nut body in electrical contact therewith. The flat bottom surface 48 of the upper electrode has a central circular recess 50 of a greater diameter than the diameter of the circle 30 of weld projections 28 and of a depth which is greater than the height of the weld projections 28 so that the projections 28 are not contacted by any part of the upper electrode 38. The pilot 29 is aligned with the opening 46 in the component part 42 and the pilot 34 extends up into the circular recess 50 in the bottom surface 48 of the upper electrode 38 and is out of contact with the upper electrode.

The lower electrode 40 has a weld nut locating pin 52 which extends through the opening 46 in the component part 42, through the central hole 14 in the nut body 12 and terminates in a central receptacle 54 extending upwardly from the base of the recess 50. The locating pin 52 does not contact the upper electrode 38 to avoid short-circuiting.

When current passes between the upper and lower electrodes, the weld projections 20 where heat is concentrated melt and weld to the surface of the component part 42. Current passes from the upper electrode 38 into the nut body 12 through the relatively large circular area 32 thereof but without contacting the weld projections 28 on the surface 18 so that heat is not concentrated as it passes from the upper electrode into the nut body and therefore does not overheat the nut body and there is no welding of the upper electrode 38 to the surface 18 of the nut body.

It will be understood that the nut body 12 could be placed over the component part 42 with its surface 18, instead of surface 16, confronting the component part 42 with the weld projections 28 in electrical contact with the component part, and the same result would be achieved, that is, the weld projections 28 on the surface 18 of the nut body 12 would melt and weld to the surface of the component part 42, and the upper welding electrode 38 would not contact the weld projections 20 on the surface 16 of the nut body 12. Hence, a good weld will be achieved no matter which way the weld nut is oriented.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A weld nut comprising:

a weld nut body having a first external surface on one side thereof and a second external surface on an opposite side thereof;

a plurality of spaced apart first weld projections extending outwardly a first distance from the first external surface, said first projections are arranged in a first circle concentric with a central axis of the nut body and wherein said first external surface has a first circular area radially outwardly of and surrounding the first circle of weld projections;

a plurality of spaced apart second weld projections extending outwardly a second distance from the second external surface, said second projections are arranged in a second circle concentric with the central axis of the nut body and wherein the second external surface has a second circular area radially outwardly of and surrounding the second circle of weld projections; and a first circular pilot extending outwardly from the first external surface around a central hole in the nut, and a second circular pilot extending outwardly from the second external surface around the central hole, said pilots adapted to extend into an opening in a component part to locate the nut;

wherein the first projections adapted to be welded to the component part when the nut body is oriented with the first external surface confronting the component part and the second projections adapted to be welded to the component part when the nut body is oriented with the second surface confronting the component part, whereby both of the orientations of the nut body are acceptable for welding purposes.

2. A weld nut in combination with a component part and a weld gun, the weld nut comprising:

a weld nut body having a first external surface on one side thereof and a second external surface on an opposite side thereof;

a plurality of spaced apart first weld projections extending outwardly from the first external surface, said first projections are arranged in a first circle concentric with a central axis of the nut body and wherein the first external surface has a first circular area radially outwardly of and surrounding the first circle of weld projections; and a plurality of spaced apart second weld projections extending outwardly from the second external surface, said second projections are arranged in a second circle concentric with the central axis of the nut body and wherein the second external surface has a second circular area radially outwardly of and surrounding the second circle of weld projections;

wherein the first projections adapted to be welded to a component part when the nut body is oriented with the first external surface confronting the component part and the second projections adapted to be welded to the component part when the nut body is oriented with the second surface confronting the component part, whereby both of the orientations of the nut body are acceptable for welding purposes;

wherein the nut body overlies the component part with either of the first and second external surfaces thereof confronting the component part, with the projections of the external surface confronting the component part in engagement with the component part and with the other of said external surfaces facing away from said component part, said weld gun having a first electrode engagable with the component part, said weld gun having a second electrode being engagable with said first circular area or said second circular area depending upon which of the external surfaces faces away from the component part, and said second electrode having a recessed area registerable with and large enough to fully receive the projections on the external surface of the nut body facing away from the component part.

3. The weld nut of claim 2, further including a first circular pilot extending outwardly from the first external surface around a central hole in the nut, and a second circular pilot extending outwardly from the second external surface around the central hole, said pilots adapted to extend into an opening in the component part to locate the nut.

4. The weld nut of claim 3, wherein the first and second circles are of the same diameter and the spacing of the first projections from one another is the same as the spacing of the second projections from one another.

* * * * *